July 31, 1956 V. H. PEOPLES Re. 24,189
SPREADER CONTROL
Original Filed April 16, 1954 2 Sheets-Sheet 1
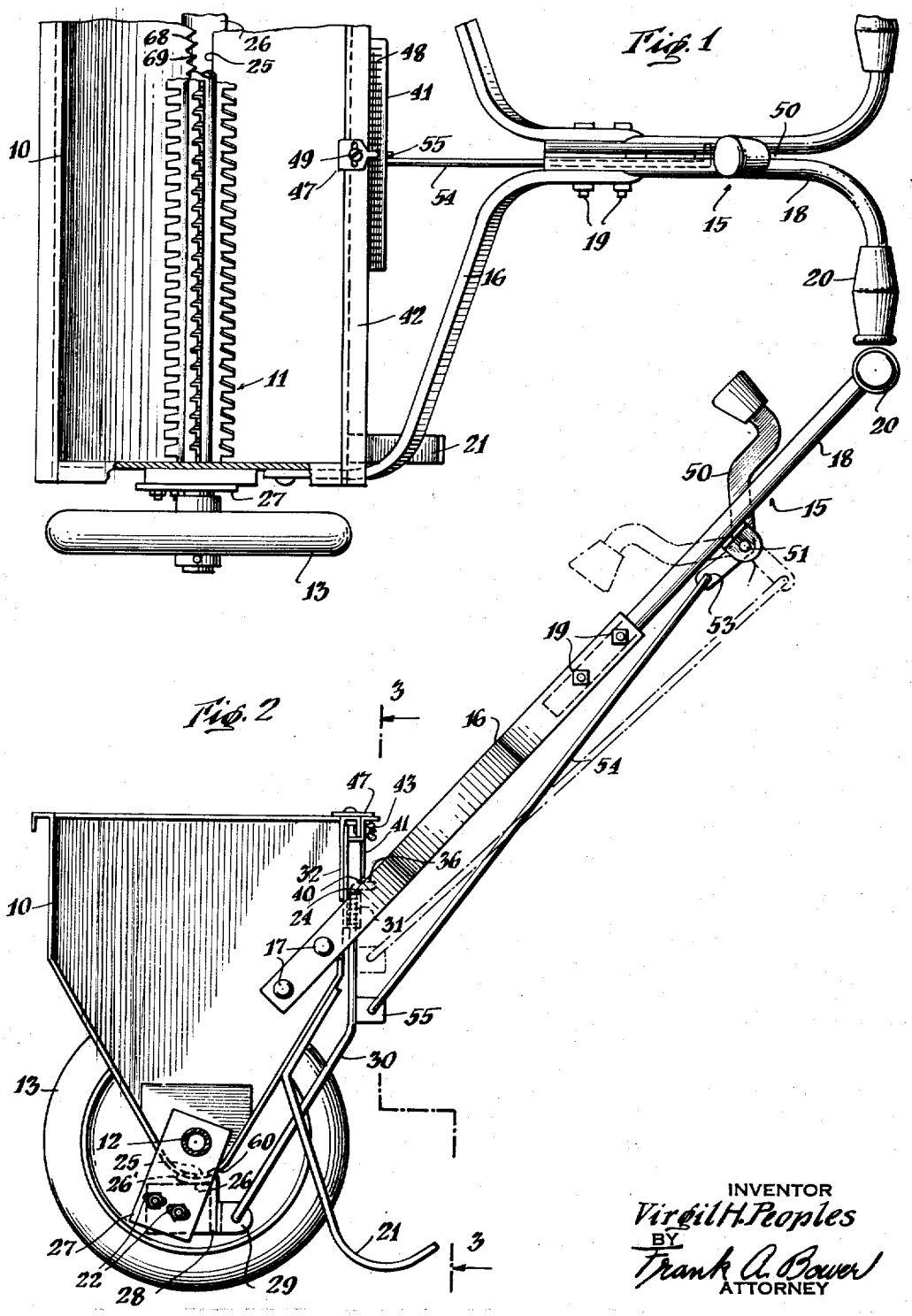
INVENTOR
Virgil H. Peoples
BY
Frank A. Bower
ATTORNEY July 31, 1956 V. H. PEOPLES Re. 24,189

SPREADER CONTROL

Original Filed April 16, 1954 2 Sheets-Sheet 2

INVENTOR
Virgil H. Peoples
BY
Frank A. Bower
ATTORNEY

United States Patent Office

Re. 24,189

Reissued July 31, 1956

24,189

SPREADER CONTROL

Virgil H. Peoples, Marysville, Ohio, assignor to O. M. Scott and Sons Company, Marysville, Ohio, a corporation of Ohio Original No. 2,718,986, dated September 27, 1955, Serial No. 423,602, April 16, 1954. Application for reissue April 12, 1956, Serial No. 577,907

16 Claims. (Cl. 222—177)

Matter enclosed in heavy brackets [ ] appears in the original patent but forms no part of this reissue specification; matter printed in italics indicates the additions made by reissue.

This invention relates to spreader devices for distributing seeds, fertilizer and the like. *This application discloses subject matter being claimed in copending application for Spreader Agitator, Serial No. 436,967, filed June 15, 1954, by George D. Tuttle.*

It is an object of this invention to provide a spreader device having a control of the rate of feed from the spreader device which provides an accurate, gradually variable pre-setting of the rate of feed.

It is a further object of this invention to provide an accurate and dependable control, maintaining with precision the desired flow at each setting of the feed opening.

Still another object of this invention is to provide a control located at the spreader handle and readily shifted to shut off the feed from the spreader device.

It is still another object of this invention to provide in a spreader device control a movable plate which sets the spreader control and adjusts the rate of feed from the spreader hopper.

These and other objects of this invention will become more apparent upon consideration of the following description taken together with the accompanying drawings in which:

Fig. 1 is a partial plan view on reduced scale of the spreader;

Fig. 2 is a side view of the same;

Figure 3:
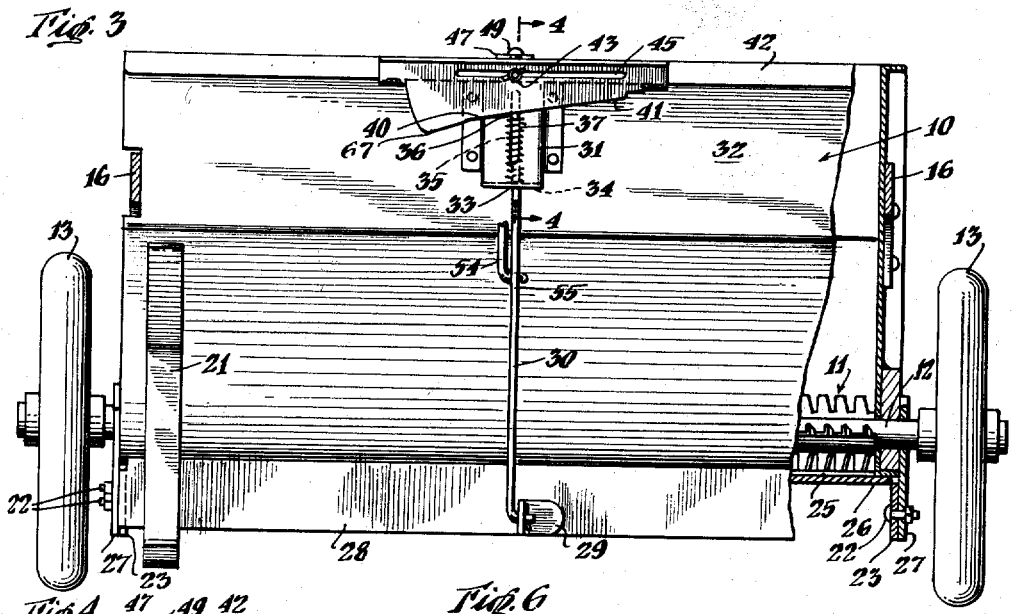
Fig. 3 is a rear view with the handle parts removed and parts broken away to show the agitator mounting and with the shutter control moved to open position.
Figure 4:
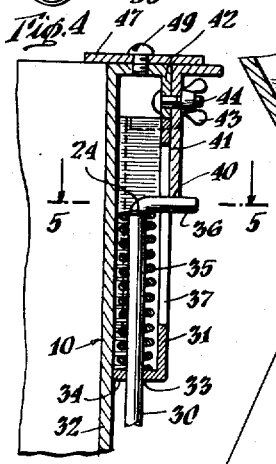
Fig. 4 is a vertical sectional view taken on line 4—4 of Fig. 3 and enlarged to full scale.
Figure 6:
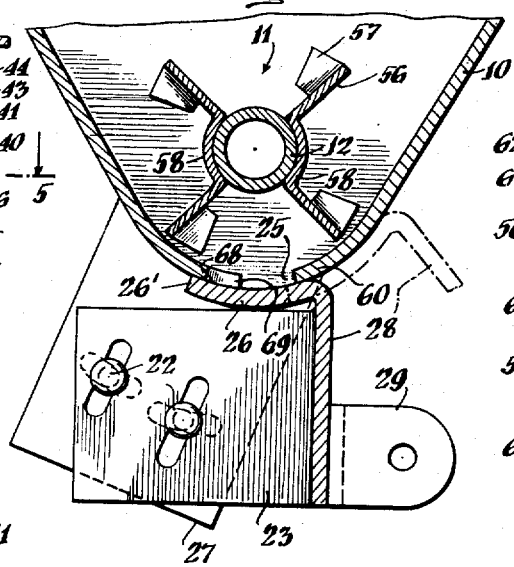
Fig. 6 is a partial vertical sectional view showing the agitator 11 in the pit of the hopper tin and with the shutter in closed position.
Figure 7:
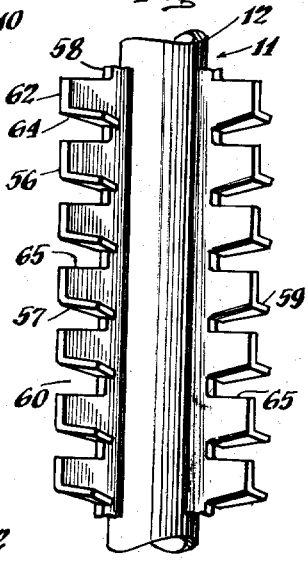
Fig. 7 is a partial plan view of the agitator.
Figure 5:
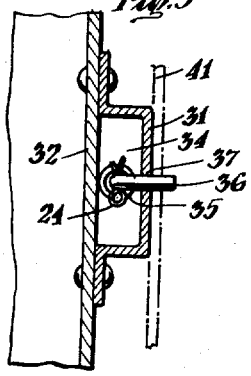
Fig. 5 is a horizontal sectional view taken on line 5—5 of Fig. 4.
Figure 8:
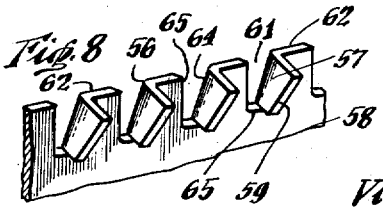
Fig. 8 is a partial perspective view of one of the agitator vanes of Fig. 7.

The spreader shown in the drawings comprises the hopper 10 with agitator 11 on shaft 12 driven by one or both of the wheels 13. A handle structure 15 comprises side strips 16 secured to the hopper at 17 and to the handle pieces 18 at 19 with the hand grips 20 at the outer end of the handle piece. The spreader is pushed forward by the operator (toward the left Figs. 1 and 2) and struts 21 (one on each side) support the spreader in standing position.

The agitator 11 stirs the material in the hopper 10 and feeds it out through the discharge opening 25 at the bottom of the hopper. To control the size of the discharge the shutter 26 swings arcuately in rotating action under the opening 25 to various adjustments and to closed position.

Prior spreaders have not been satisfactory in the control of the discharge in that irregularities in the feed have been unavoidable due both to uneven action of the discharge means and shifting of the shutter from an intended fixed setting. For instance, shutter operating means mounted on the handle would move the shutter with every operation of the spreader bringing pressure on the handle flexing it and correspondingly varying the position of the shutter.

In the spreader of this invention, the shutter operating means effects an accurate dependable control independently of the handle parts and not effected thereby while at the same time providing for easy handle control of the shutter closing. Coupled with this is a very even feed and distribution of the spread material accurately responsive to the shutter setting at all times.

The shutter 26 is pivotally mounted on shaft 12 by brackets 27 at each end adjustably fastened at 22 to the flange ends 23 of the shutter strip 28 pivotally connected at lug 29 to an adjusting rod 30 the upper end of which is held slideable in the box or casing 31 on the hopper panel 32. The rod 30 fits through the opening 33 in flange 34 of the casing and is urged upward toward open position of the shutter by compression spring 35 surrounding the rod and held between flange 34 and the cotter pin 24 at bent upper end 36 of the rod. This end 36 protrudes outward through the slot 37 of casing 31 and engages against the inclined cam edge 40 of slide plate 41 adjustably mounted on the flange 42 of the hopper and held in adjusted position by thumb nut 43 on screw 44 carried by casing 31 and protruding through slot 45 of the plate 41.

For each position of plate 41 there will be a corresponding open position of the shutter 26 and this will be securely maintained by spring 35 holding rod 30 in place against the cam edge 40. The operator merely loosens the thumb nut 43 and slides the cam plate 41 to desired adjustment as shown, for instance, by pointer 47 on scale 48 carried by the said slide cam plate 41. The pointer 47 is fitted to the top edge of hopper 10 and after final assembly at the factory is precisely positioned to proper relation to the plate 41 and rigidly set at this final calibration by set screw 49.

This shutter setting provides a very close adjustment which will be precisely maintained in all manipulations of the spreader by the compression spring 35, there being no loose parts or tolerances between the shutter 26 and the control cam edge 40 of plate 41. The single pivot at lug 29 is normally under continuous compression taking up any slight clearance since the shutter structure as a whole tends to turn counter-clockwise (Fig. 2) under the counter-clockwise (forward) turning of the shaft 12.

Combined with this shutter adjustment is the shutter closing control from the handle easily within reach of the user to close and open the discharge 25 by movement of the shutter against the effort of the spring 35 and held closed thereby. To accomplish this, a closure lever 50 is pivoted at 51 to handle piece 18 at bracket 52 and at its lower end is pivoted at 53 to rod 54 pivoted at its other end in lug 55 of adjusting rod 30. In open spreading position of the shutter 26 these handle closure parts are in dotted line position (Fig. 2) with lever 50 loosely tipped forward to allow for any desired adjustment of the feed opening and in no way interfering with it. The closure parts are free and exert no disturbing pressure on the set adjustment of the hopper parts. Any flexure or yielding of the handle parts is automatically accommodated by responsive pivoting of the closure linkages with no effect on the shutter held in its set position by the compression spring 35.

Then when the spreading is to be shut off temporarily or at the end of a spreading operation the lever 50 is flipped backward (clockwise Fig. 2) and this presses the rod 54 forward and downward to correspondingly depress the rod 30 and close the shutter 26, acting at the same time to compress spring 35. The closing movement reaches its maximum when the pivot at 53 passes its dead center after which under a slight expansion of spring 35 there is a reverse shift of the shutter which is stopped still in fully closed position by contact of lever 50 at its lower end with the underside of handle piece 18. Here, the parts are securely held by the spring 35 with the shutter closed (Fig. 2) and held against opening, the closure overlap at 56 being ample to compensate for any shifting due to flexure of the handle parts.

The shutter adjustment and control thus gives a precise discharge of the material during spreading under all conditions and also provides for a simple closing and opening of the shutter by a flip of an easily accessible lever at the handle.

To ensure satisfactory spreading, it is also important to properly deliver the material to and through the discharge from the hopper.

To accomplish this shaft 12 is provided with the special agitator 11 having vanes 56 provided with stirrer blades or teeth 57. The vanes 56 are integral with an intermediate arcuate strip 58 welded to the shaft 12, the axis of which is substantially concentric with the rounded bottom portion 60 of the hopper so that the agitator blades 57 at their tips pass in close proximity to these bottom surfaces and sweep over the discharge opening or slot 25. These blades 57 are integrally formed from the vanes by stamping and bending over a series of tapered wing pieces 59 leaving V-shaped notches 61 between the axial portions 62 of the blades 57. Preferably the notches 61 are less in width than the blades; and the wing pieces 59 are as shown facing in the same direction projecting forward from the leading faces of the vanes. Each wing or plow portion 59 is nearly at right angles to the axial blade portion 62 and is connected thereto by bend 64 inclined to the radial and facing the radial edge 65 at the other side of the notch 61.

This agitator 11 gives a very thorough cutting and mixing of the material in the hopper and at the lower portion of its movement in approaching and sweeping over the discharge opening 25 it distributes the outflow with an axial component through the discharge 25 in a very even manner.

The discharge 25 may be, for instance, $11/16''$ in full width with teeth or serrations 69 $3/16''$ in depth and a closure overlap of edge 26' of about $1/16''$. The edge 26' of shutter bar 26 may be bent around under the bar for reinforcement of the latter. The shutter is mounted to slide very accurately.

Cooperating with this feeding of the material the setting of the shutter 26 controls the amount discharging according to the setting of slide plate 41 the cam plate edge 40 of which may be a straight line or curved, for instance, to vary the rate of adjustment as closure is approached as indicated at 67.

The edges of discharge orifice 25 may also be shaped to superpose a variation in the rate of feed as the shutter edge moves across the opening. For instance the closure edge 68 of the opening 25 may be serrated as shown with projections 69 of generally triangular formation to reduce the available area of the discharge in near closing positions of the shutter. These projections 69 may be shaped as desired to be rectangular rather than triangular or to be intermediate by having edges inclined to give a progressive reduction in available discharge area as closure is approached. This, together with the shaping of cam edge 40 of slide plate 41, will provide a very accurate predetermination of the feed rate as set on the scale 49. Additional precision in adjustment may be provided by the spacing of the scale divisions in accordance with the actual feed rate as determined by test runs and as previously noted the location of the pointer 47 at its proper setting will be determined after the complete assembly.

The principle of the invention has been set forth in connection with a specific embodiment but is not confined thereto. The handle 15 may be located on the opposite side of the hopper 10 and the spreader may be adapted as a trailer for power driving, replacing the handle with a corresponding draft gear and remount of the handle lever 50. The shutter control handle 50 may be variously located and its axis of rotation may be in a vertical plane instead of horizontal as shown, and the handle may be positioned either below or above the handle structure 18. Preferably this control lever 50 will not project backward beyond the hand grips 20 which are usually held close to the body of the operator.

In all variations the precise and dependable control of the feed rate will be maintained together with a quick and easy operation of the shutter. The construction is inexpensive and strong and durable and the operation is adaptable to the spreading of a wide variety of materials, simply by proper directions giving the scale settings most suitable for the spreading of the seeds, fertilizer, herbicide or the like under the particular conditions of use for each application.

I claim:

1. A wheel supported spreader having a hopper with a handle and a discharge opening and a shutter adapted to close said discharge opening in one position and to open said discharge opening in a number of other set positions of said shutter, and control means for said shutter movable on one side of a dead center position to a fixed position holding said shutter in closed position and movable to the other side of said dead center to a plurality of said set open positions, said control means comprising a lever mounted on said handle and connecting means between said lever and said shutter, an adjustable member limiting the movement of the said control means in each of said set adjusted positions of said shutter, and spring means holding said control means in fixed position with the shutter in said closed position and also acting to hold said shutter in each of its adjusted set positions.

2. A hand operated spreader comprising a wheel supported hopper having a discharge opening and a movable shutter therefor adapted to close said discharge opening in one position and open it in a number of other set positions of said shutter, a spreader handle carried by said hopper, control means for said shutter comprising an adjustable member limiting said shutter to a set of adjusted positions, a handle lever pivotally carried by the spreader handle and connected to said shutter and movable to a fixed position on one side of a dead center position of the handle lever holding said shutter in closed position and movable to a plurality of positions located on the other side of said dead center and corresponding to said set of adjusted positions of said shutter, and spring actuated means yieldingly holding said handle lever in said fixed position on one side of dead center with the shutter in closed position and also acting to yieldingly sold said handle lever in each of its other positions on the other side of dead center with said shutter in adjusted set position.

3. In combination with a spreader for distributing granular material having a wheel supported granular material holding hopper formed with a material discharge opening through said hopper and having a movable shutter with an edge adjustable in relation to the edge of said opening to regulate the flow of material from said hopper, a handle on said hopper for manipulating said spreader and rigidly connected to said hopper to form a rigid member therewith, a shutter control means comprising a movable linkage provided by a hand manipulated lever pivotally connected to the handle of said rigid member and having link means connecting it to said shutter permitting the said lever to move from adjusted positions on one side of dead center to a closed shutter locking position on the other side of dead center, adjustable means limiting said shutter to a given setting of a range of settings and resilient means engaging said shutter control means for holding said shutter at a selected setting, said link means actuating said shutter control means to shift from an open position to a closed position upon turning of said lever through dead center to a position on the other side thereof.

4. In the spreader combination set forth in claim 3, a stop limiting the shutter closing movement of the hand manipulated lever to lock the shutter in closed position.

5. A spreader comprising a wheel supported hopper having a discharge opening and a movable shutter therefor adapted to close said discharge opening in one position and open it in a number of other set positions of said shutter, a handle carried by said hopper, control means for said shutter comprising an adjustable member carried by said hopper and movable to desired settings of said shutter, and a handle lever pivotally mounted on the handle and connected to said shutter and movable to a fixed position on one side of a dead center position of the handle lever holding said shutter in closed position and movable to a plurality of positions on the other side of said dead center and corresponding to said set adjusted positions of said shutter, and spring actuated means holding said handle lever in said fixed position with the shutter in closed position and also acting to hold said handle lever in each of its other positions with said shutter in adjusted set position.

6. A spreader for granular material comprising a hopper having a rounded bottom portion, a shaft coaxial with said bottom supporting said hopper and having wheels at each end, an agitator mounted on said shaft and having blades moving in proximity to the said rounded bottom, discharge means in said bottom comprising a series of V-formed edges in a line parallel to the agitator axis, and a rotatable shutter located on the under surface of said rounded bottom portion and having a control edge on the outside of said hopper bottom, and under said V-formed edges, and means for moving said shutter control edge progressively toward and across said V-formed edges of said discharge means towards closed position at the points of the V-formations so as to vary the resulting V-shaped discharge openings simultaneously both longitudinally along the axis and transversely normal thereto for a given movement of the shutter and continuously supply the varying V-shaped discharge openings from the entire area of said discharge means filled with the material from the hopper under the stirring action of said agitator.

7. A spreader as set forth in claim 6 wherein the resulting V-shaped discharge openings are directed forward so that the blades of the agitator move from the narrowest width to the broadest width of the openings in their movement along the bottom of the hopper.

*8. A spreader as defined in claim 1, wherein said discharge opening and cooperating shutter provide a row of variable area discharge ports in the bottom of said hopper extending transversely across the bottom of said hopper, each of said discharge ports having edges converging toward the front of said hopper and said shutter having a transverse forward control edge which, in the closed position, is disposed in front of said convergent edges and in set adjusted positions is disposed at predetermined positions to the rear of the forward end of said edges to provide substantially straight transverse rear edges for said discharge ports.*

*9. A spreader comprising: a hopper having a rounded bottom portion; a shaft, substantially coaxial with said bottom portion, having wheels at each end for supporting said hopper; a rotatable agitator mounted on said shaft and having blades moving in proximity to said rounded bottom; means for rotating said agitator, outlet means in said bottom comprising a row of laterally spaced ports; a rotatable shutter member located adjacent the undersurface of said rounded bottom portion having a control edge on the outside of said hopper bottom and movable under said ports; end flanges on said shutter member; depending brackets pivotally disposed on each side of said hopper; means adjustably fastening each of said shutter member end flanges to an associated depending bracket to provide an adjustable radius of rotation of said shutter member; and means, connected to said shutter member intermediate said means fastening said end flanges to said depending brackets, for positioning said shutter control edge between predeterminable progressively open positions across said ports and a closed position over said ports; said ports having ends shaped to simultaneously vary the resultant size of the port openings both parallel relative to said shutter control edge and transversely normal thereto for given predetermined settings of said shutter and to continuously supply said variable area ports along the entire area for said outlet means with the material from the hopper under the stirring action of said agitator.*

*10. A spreader as defined in claim 9, wherein said means for positioning said shutter member control edge comprisese a spring biased operating linkage, connected to said shutter member and urging said shutter member toward open positions, said linkage including an overcenter locking movement for maintaining said shutter member in closed position against the spring biased urging.*

*11. A spreader comprising: a hopper having a rounded bottom portion; a shaft, substantially coaxial with said bottom portion having wheels at each end for supporting said hopper; a rotatable agitator mounted on said shaft and having blades moving in proximity to said rounded bottom; means for rotating said agitator, outlet means in said bottom comprising a row of laterally spaced ports; a rotatable shutter member located adjacent the undersurface of said rounded bottom portion having a control edge on the outside of said hopper bottom and movable under said ports; and means for positioning said shutter control edge between predeterminably progressively open positions across said ports and a closed position over said ports comprising a selectively positionable abutment member mounted on said hopper and a spring biased link connected to said shutter member and biased to move said shutter member toward an outlet open position as determined by engagement of said link against said abutment member; said ports having ends shaped to simultaneously vary the resultant size of the port openings both parallel relative to said shutter control edge and transversely normal thereto for given predetermined settings of said shutter and to continuously supply said variable area ports along the entire area of said outlet means with the material from the hopper under the stirring action of said agitator.*

*12. A spreader comprising: a hopper having a rounded bottom portion; a shaft, substantially coaxial with said bottom portion, having wheels at each end for supporting said hopper; a rotatable agitator mounted on said shaft and having circular rows of blades moving in proximity to said rounded bottom; means for rotating said agitator; outlet means in said bottom comprising a row of laterally spaced ports of which the longitudinal median lines have a predetermined fixed relationship relative to the paths of movement of said agitator blades; a rotatable shutter member located adjacent the under surface of said rounded bottom portion having a control edge on the outside of said hopper bottom and movable under said ports; and means for positioning said shutter control edge between predeterminable progressively open positions across said ports; said ports having ends shaped to simultaneously vary the resultant size of the port openings substantially equally on each side of said median line parallel relative to said shutter control edge and transversely normal thereto thereby maintaining said fixed relationship of the port longitudinal median lines relative to said agitator blades, for given predetermined settings of said shutter and to continuously supply said variable area ports along the entire area of said outlet means with the material from the hopper under the stirring action of said agitator.*

*13. A spreader for distributing material comprising: a wheeled hopper having material distribution means with*

*an adjustable outlet control movable between closed and open positions and resiliently biased toward an open position permitting material discharge: structural means fixed to said hopper for moving said spreader; and operating means for said outlet control fixed on said structural means with a pivotable lever mechanism including a locking movement to maintain said outlet control in a closed non-discharging position against the resilient biasing force.*

*14. A spreader for distributing material comprising: a wheeled hopper having material distribution means with an adjustable outlet control movable between closed and open positions and an adjustable stroke resilient biasing means mounted on said hopper and connected to bias said outlet control toward selective open positions permitting material discharge; structural means fixed to said hopper for moving said spreader; and operating means for said outlet control, fixed on said structural means, with mechanism including a locking movement to maintain said outlet control in a closed non-discharging position against the resilient biasing force.*

*15. A spreader as defined in claim 14, wherein said adjustable stroke resilient biasing means comprises an adjustable abutment member movably mounted adjacent the top edge of said hopper and a fixed mechanism pivotally attached to said outlet control and resiliently biased into engagement with said adjustable abutment member.*

*16. A spreader for distributing material comprising: a hopper; ground engaging wheels on said hopper; material distributing means in said hopper operated by rotation of at least one of said wheels and including discharge ports on the hopper bottom extending in a row parallel to the axis of said wheels, a control shutter positioned closely adjacent said discharge ports on the exterior of said hopper and pivotally mounted on said hopper on an axis parallel with the wheel axis and movable in a limited fore and aft arc, its movement in the forward direction*

*being effective to close said ports and its movement in the aft direction being effective to open said ports; means connecting to and biasing said control shutter toward its open position; adjustable means engageable by said biasing means to limit biased movement of the shutter to open position; structural means fixed to said hopper for moving said spreader; and operating means for said outlet control shutter fixed on said structural means with a pivotable lever mechanism including an overcenter locking movement to maintain said outlet control shutter in a forward non-discharging position against the resilient biasing force.*

References Cited in the file of this patent or the original patent

UNITED STATES PATENTS

| | | |
|---|---|---|
| 108,672 | Allen | Oct. 25, 1870 |
| 331,600 | Zeigler et al. | Dec. 1, 1885 |
| 493,146 | Bender | Mar. 7, 1893 |
| 1,882,340 | Ryan | Oct. 11, 1932 |
| 1,888,821 | Fearn | Nov. 22, 1932 |
| 1,948,861 | Lindgren | Feb. 27, 1934 |
| 2,193,253 | Masters | Mar. 12, 1940 |
| 2,318,064 | Delaney | May 4, 1943 |
| 2,495,906 | Porter | Jan. 31, 1950 |
| 2,510,231 | Juzwiak | June 6, 1950 |
| 2,533,386 | Masters | Dec. 12, 1950 |
| 2,535,414 | Heidger | Dec. 26, 1950 |
| 2,560,732 | Moore, Sr. | July 17, 1951 |
| 2,620,094 | Swenson | Dec. 2, 1952 |
| 2,626,083 | Masters | Jan. 20, 1953 |
| 2,678,145 | Juzwiak et al. | May 11, 1954 |

OTHER REFERENCES

Photoprint of an O. M. Scott and Sons publication, SSM 492, dated September 1950, illustrating details of a spreader used prior to the invention of this application.